Patented Nov. 24, 1953

2,660,579

UNITED STATES PATENT OFFICE 2,660,579

SYNTHESIS OF 2-AMINO-4,6-DIMETHYL PYRIMIDINE

Theodore F. Scholz, Somerville, N. J., and Gordon M. Smith, Oak Ridge, Tenn., assignors to American Cyanamid Company, New York, N. Y., a corporation of Maine No Drawing. Application July 7, 1951, Serial No. 235,675

6 Claims. (Cl. 260—256.4)

This invention relates to an improved method of preparing 2-amino-4,6-dimethyl pyrimidine.

2-amino-4,6-dimethyl pyrimidine, which is a principal intermediate for the manufacture of 2-sulfanilamido-4,6-dimethyl pyrimidine (sulfamethazine), has been prepared in the past by reacting in anhydrous solvent a guanidine salt and acetyl acetone. A serious economic disadvantage of the prior process is the necessity of an elaborate distillation equipment to recover the anhydrous solvent. Another drawback of the prior processes is the long time cycle which, on plant size batches, is normally of the order of about 6 hours.

The present invention eliminates the drawbacks of the earlier processes by using an aqueous alkaline medium for the reaction, and since there is no anhydrous solvent, no recovery equipment is necessary. In fact, an additional advantage is to be noted in that the reaction proceeds more rapidly, and on a plant scale batch a great saving of time results, the cycle being shortened from about 6 hours to 2 hours.

The alkali to be used in the reaction medium is not critical and it is possible to use any of the ordinary alkalies such as alkali metal and alkaline earth metal hydroxides, alkali metal carbonates, and the like. Because of its cheapness and the decreased likelihood of excessive alkalinity, carbonates such as sodium carbonate are preferred.

The reaction temperature may vary over a considerable range. In general, temperatures below 50° C. do not give commercially usable yields, increasing the temperature improves the yields with optimum results being obtained at 95–100° C.

The guanidine salt to be used is not critical and any of the ordinary salts such as nitrates, halides, sulfates, and the like, may be employed. It is also possible to add the alkali, which neutralizes any acid set free in the reaction, either at the start or by gradual addition as the reaction proceeds. Little or no difference in the recovery is to be noted and, therefore, the choice of adding the alkali in the beginning or gradually as the reaction preceeds can be guided by consideration of operating convenience.

Not only does the process of the present invention result in a good yield without corrosion and solvent recovery problems and with a short time cycle, but a product of excellent purity is obtainable. In general, high recovery and high purity go hand in hand, and the preferred higher temperatures result both in maximum recovery and maximum purity. The method of adding alkali makes but little difference as far as purity is concerned, very few by-products being obtainable by either modification.

The invention will be described in great detail in conjunction with the following specific examples. The parts are by weight unless otherwise specified.

Example 1

To 250 parts of water are added 135.5 parts guanidine nitrate, 83.5 parts sodium carbonate and 100 parts acetyl acetone. The slurry is then heated to 95–100° C. for two hours during which time large crystals form. The slurry is cooled to room temperature and diluted to 488 parts with water. It is further cooled to 10° C., held for 1 hour and filtered. The filter cake is washed with 75 parts of a 25% brine solution at 5–10° C. and sucked dry. The wet cake is added to 330 parts water and heated to 85–90° C. To the solution is added 4.4 parts activated carbon and it is clarified after 15 minutes. To the hot filtrate is added 95 parts salt, and the slurry is stirred 10 minutes. After stirring, it is cooled to 15° C., stirred for 15 minutes, and filtered. The cake is washed with 30 parts 5–10° C. water, sucked dry, and dried at 50° C. A yield of more than 85% is obtained, based on the acetyl acetone and the product is almost completely pure when tested in anhydrous form by the bromide-bromate titration. Impurities amount to about 1½ to 2 parts per thousand.

Example 2

To 250 parts water are added 106 parts guanidine hydrochloride, 83.5 parts sodium carbonate, and 100 parts acetyl acetone. The slurry is then heated to 95–100° C. for 2 hours during which time large crystals form. The slurry is cooled to room temperature and diluted to 488 parts with water. It is further cooled to 10° C., held for 1 hour and filtered. The filter cake is washed with 75 parts of a 25% brine solution at 5–10° C. and sucked dry. The wet cake is added to 330 parts water and heated to 85–90° C. To the solution is added 4.4 parts activated carbon, and it is clarified after 15 minutes. To the hot filtrate is added 95 parts salt, and the slurry is stirred 10 minutes. After stirring, it is cooled to 15° C., stirred for 15 minutes, and filtered. The cake is washed with 30 parts 5–10° C. water, sucked dry, and dried at 50° C. The yield and purity are almost as high as from Example 1.

Example 3

To 250 parts water is added 83.5 parts sodium carbonate and stirred to solution. The carbonate solution is added, over 2 hours, to a slurry of 100 parts acetyl acetone and 135.6 parts guanidine nitrate held at 95–100° C. Large crystals form near the end of the addition. The slurry is stirred for 15 minutes at 95–100° C. and then cooled to room temperature where it is diluted to 488 parts with water. Cooling is continued to 10° C. and the slurry is held 1 hour at 10° C. before filtering. The filter cake is washed with 75 parts of a 25% brine solution at 5–10° C. and sucked dry. The wet cake is added to 330 parts water and heated to 85–90° C. To the solution is added 4.4 parts activated carbon, and it is clarified after 15 minutes. To the hot filtrate is added 95 parts salt, and the slurry is stirred for 10 minutes. After stirring, it is cooled to 15° C., stirred for 15 minutes and filtered. The cake is washed with 30 parts 5–10° C. water, sucked dry, and dried at 50° C. The yield and purity are substantially the same as in Example 1.

*Example 4*

To 250 parts water are added 135.5 parts guanidine nitrate, 83.5 parts sodium carbonate, and 100 parts acetyl acetone. The slurry is heated to 50–55° C. for 6 hours and then cooled to room temperature, and diluted to 488 parts with water. It is further cooled to 10° C., held for 1 hour, and filtered. The filter cake is washed with 75 parts of a 25% brine solution at 5–10° C. and sucked dry. The wet cake is added to 330 parts water and heated to 85–90° C. To the solution is added 4.4 parts activated carbon, and it is clarified after 15 minutes. To the hot filtrate is added 95 parts salt, and the slurry is stirred 10 minutes. After stirring, it is cooled to 15° C., stirred for 15 minutes and filtered. The cake is washed with 30 parts 5–10° C. water, sucked dry, and dried at 50° C. A yield of somewhat under 60%, with a purity of slightly over 80%, is obtained. It will be noted in this example, which is carried out at the lowest temperature practical in the present process, requires a longer period of time and gives both poorer yield and less pure product.

*Example 5*

To 200 parts water are added 135.5 parts guanidine nitrate and 100 parts acetyl acetone. Sufficient 50% caustic is then added to give a pink spot on phenolphthalin test paper. About 30 parts by volume are required. The slurry is then heated to 90–95° C. and stirred for 7 hours. More 50% caustic is added during the reaction period to maintain a spot on phenolphthalin test paper, a total of 56 parts by volume being required. The slurry is cooled to room temperature and diluted to 488 parts with water. It is further cooled to 10° C., stirred for 1 hour, and filtered. The filter cake is washed with 75 parts of a 25% brine solution at 5–10° C. and sucked dry. The wet cake is added to 330 parts water and heated to 85–90° C. To this solution is added 4.4 parts activated carbon, and it is clarified after 15 minutes. To the hot filtrate is added 95 parts salt, and the slurry is stirred 10 minutes. It is then cooled to 15° C., stirred for 15 minutes, and filtered. The cake is washed with 30 parts of 5–10° C. water, sucked dry and dried at 50° C. The yield is about 65% and the anhydrous purity is 99.2%.

The foregoing examples deal with batches of commercial size and the saving in time when the preferred temperature range is used is of the same order of magnitude in regular plant operation. Reaction time, of course, varies to some extent with batch size, and the time given in the examples is not necessarily applicable to laboratory tests.

We claim:

1. A process of producing 2 - amino - 4,6 - dimethyl pyrimidine which comprises reacting a guanidine salt with acetyl acetone in an aqueous alkaline medium.

2. A process according to claim 1 in which the alkali is sodium carbonate.

3. A process according to claim 1 in which the guanidine salt is guanidine nitrate.

4. A process according to claim 1 in which the guanidine salt is guanidine hydrochloride.

5. A process according to claim 1 in which the alkali is sodium hydroxide.

6. A process according to claim 1 in which the alkali is added gradually during the reaction.

THEODORE F. SCHOLZ.
GORDON M. SMITH.

References Cited in the file of this patent

Combes et al., Bull. Soc. Chim. 7791 (1892).